(12) United States Patent
Shpilyuck et al.

(10) Patent No.: US 12,556,622 B2
(45) Date of Patent: Feb. 17, 2026

(54) STRETCHED ENVIRONMENT PROVISIONING

(71) Applicant: Dell Products L.P., Round Rock, TX (US)

(72) Inventors: Boris Shpilyuck, Ashdod (IL); Yair Yotam, Lehavim (IL); Nisan Haimov, Beer-Sheva (IL); Igor Dubrovsky, Beer-Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/643,879

(22) Filed: Apr. 23, 2024

(65) Prior Publication Data

US 2025/0330532 A1 Oct. 23, 2025

(51) Int. Cl.
*H04L 67/63* (2022.01)
*G06F 9/455* (2018.01)
*H04L 67/564* (2022.01)

(52) U.S. Cl.
CPC ............ *H04L 67/63* (2022.05); *H04L 67/564* (2022.05); *G06F 2009/45587* (2013.01)

(58) Field of Classification Search
CPC .............. H04L 67/63; H04L 67/564; G06F 2009/45587
See application file for complete search history.

(56) References Cited

U.S. PATENT DOCUMENTS

| | | | |
|---|---|---|---|
| 10,623,390 B1* | 4/2020 | Rosenhouse | H04L 67/10 |
| 10,764,244 B1* | 9/2020 | Mestery | H04L 63/0281 |
| 10,983,769 B2* | 4/2021 | White | G06F 9/5038 |
| 11,057,393 B2* | 7/2021 | Coffing | G06Q 20/40 |
| 11,153,412 B1 | 10/2021 | Varadan et al. | |
| 11,249,856 B2* | 2/2022 | Natanzon | G06F 16/128 |
| 11,283,635 B2* | 3/2022 | Smith | H04L 41/0894 |
| 11,457,080 B1 | 9/2022 | Meduri et al. | |
| 11,563,636 B1 | 1/2023 | Kairali et al. | |
| 11,570,271 B2 | 1/2023 | Bahl et al. | |
| 11,570,279 B1 | 1/2023 | Kairali et al. | |
| 11,625,281 B2* | 4/2023 | Wang | G06F 9/44505 718/102 |

(Continued)

OTHER PUBLICATIONS

Notice of Allowance mailed Dec. 22, 2023 for U.S. Appl. No. 18/156,183, 37 pages.

(Continued)

*Primary Examiner* — G. C. Neurauter, Jr.
(74) *Attorney, Agent, or Firm* — Amin, Turocy & Watson, LLP

(57) ABSTRACT

A system can maintain a microservices architecture on the system, wherein the microservices architecture comprises a group of microservices. The system can maintain a secure connection with a remote computer that is external to the system, wherein the remote computer executes a remote microservice. The system can receive a request to invoke the group of microservices. The system can invoke the remote microservice via the secure connection based on identifying the remote microservice using a tag of the request, wherein the tag is applied to the request by the system. The system can, after determining that the remote microservice has responded to the request, finish processing the request using the group of microservices.

20 Claims, 10 Drawing Sheets

(56) References Cited

U.S. PATENT DOCUMENTS

| | | | |
|---|---|---|---|
| 11,880,727 B2* | 1/2024 | Carranza | H04L 67/133 |
| 11,968,086 B1 | 4/2024 | Shpilyuck et al. | |
| 11,968,231 B2* | 4/2024 | Kairali | H04L 63/1408 |
| 12,223,372 B2* | 2/2025 | Shpilyuck | G06F 9/547 |
| 2005/0278652 A1 | 12/2005 | Scholz | |
| 2011/0197163 A1 | 8/2011 | Jegal et al. | |
| 2013/0138612 A1 | 5/2013 | Iyer | |
| 2014/0229698 A1 | 8/2014 | Sivasubramanian et al. | |
| 2017/0140146 A1 | 5/2017 | Mehta et al. | |
| 2018/0270122 A1 | 9/2018 | Brown et al. | |
| 2019/0034617 A1* | 1/2019 | Scarlata | G06F 9/30007 |
| 2019/0179631 A1 | 6/2019 | Benedetti et al. | |
| 2019/0273746 A1 | 9/2019 | Coffing | |
| 2020/0120168 A1 | 4/2020 | Nainar et al. | |
| 2020/0177549 A1 | 6/2020 | Barton et al. | |
| 2020/0336553 A1 | 10/2020 | Yeddula et al. | |
| 2020/0366580 A1* | 11/2020 | Sinha | H04L 43/0817 |
| 2021/0174952 A1 | 6/2021 | Leong et al. | |
| 2021/0191706 A1* | 6/2021 | Sn | G06F 11/3466 |
| 2021/0203729 A1* | 7/2021 | Therrien | H04L 49/552 |
| 2021/0342738 A1 | 11/2021 | Sarferaz | |
| 2021/0400464 A1 | 12/2021 | Canas | |
| 2022/0067024 A1 | 3/2022 | Pethe | |
| 2022/0092077 A1 | 3/2022 | Darden et al. | |
| 2022/0109741 A1 | 4/2022 | Chen et al. | |
| 2022/0113911 A1 | 4/2022 | Kuriata et al. | |
| 2022/0342718 A1 | 10/2022 | Iqbal et al. | |
| 2022/0386393 A1 | 12/2022 | Tamvada et al. | |
| 2023/0130973 A1 | 4/2023 | Madan et al. | |
| 2024/0037147 A1* | 2/2024 | Kukulinski | G06F 9/547 |
| 2024/0231972 A1 | 7/2024 | Shpilyuck et al. | |
| 2024/0241715 A1 | 7/2024 | Shpilyuck et al. | |

OTHER PUBLICATIONS

Corrected Notice of Allowability mailed Jan. 3, 2024 for U.S. Appl. No. 18/156,183, 39 pages.

Office Action mailed May 6, 2024 for U.S. Appl. No. 18/151,903, 39 pages.

Shpilyuck, et al. "Utilizing Local Workgroups in a Stretched Environment" U.S. Appl. No. 18/643,887, filed Apr. 23, 2024, 56 pages.

Office Action mailed Sep. 23, 2024 for U.S. Appl. No. 18/154,477, 80 pages.

Notice of Allowance mailed Nov. 19, 2024 for U.S. Appl. No. 18/151,903, 40 pages.

Office Action mailed Apr. 16, 2025 for U.S. Appl. No. 18/154,477, 80 pages.

Office Action mailed Oct. 6, 2025 for U.S. Appl. No. 18/154,477, 93 pages.

* cited by examiner

700

↓

( 702 )

↓

MAINTAINING A SECURE CONNECTION WITH A COMPUTER THAT IS EXTERNAL TO THE SYSTEM, WHEREIN THE COMPUTER EXECUTES A REMOTE MICROSERVICE 704

↓

RECEIVING A REQUEST TO INVOKE A GROUP OF MICROSERVICES 706

↓

INVOKING THE REMOTE MICROSERVICE VIA THE SECURE CONNECTION BASED ON IDENTIFYING THE REMOTE MICROSERVICE BY A TAG OF THE REQUEST, WHEREIN THE TAG IS APPLIED TO THE REQUEST BY THE SYSTEM 708

↓

AFTER DETERMINING THAT THE REMOTE MICROSERVICE HAS RESPONDED TO THE REQUEST, FINISHING PROCESSING THE REQUEST WITH THE GROUP OF MICROSERVICES 710

800
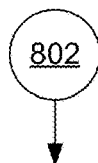
ESTABLISHING THE SECURE CONNECTION WITH THE COMPUTER BEFORE INVOKING THE REMOTE MICROSERVICE 804
KEEPING THE SECURE CONNECTION OPEN THROUGHOUT USER ACCOUNT INTERACTION WITH THE SYSTEM, WHEREIN THE USER ACCOUNT IS ASSOCIATED WITH THE COMPUTER 806
FIG. 8

STRETCHED ENVIRONMENT PROVISIONING

BACKGROUND

Microservices can generally be a variant of a service-oriented architecture (SOA) computer architectural style that structures an application as a collection of loosely coupled services. Microservices can be deployed as part of a software as a service (Saas) model, where a system of microservices is centrally hosted, and is accessed by a thin client (e.g., a web browser).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a microservices architecture on the system, wherein the microservices architecture comprises a group of microservices. The system can maintain a secure connection with a remote computer that is external to the system, wherein the remote computer executes a remote microservice. The system can receive a request to invoke the group of microservices. The system can invoke the remote microservice via the secure connection based on identifying the remote microservice using a tag of the request, wherein the tag is applied to the request by the system. The system can, after determining that the remote microservice has responded to the request, finish processing the request using the group of microservices.

An example method can comprise maintaining, by a system comprising at least one processor, a secure connection with a computer that is external to the system, wherein the computer executes a remote microservice. The method can further comprise receiving, by the system, a request to invoke a group of microservices. The method can further comprise invoking, by the system, the remote microservice via the secure connection based on identifying the remote microservice by a tag of the request, wherein the tag is applied to the request by the system. The method can further comprise, after determining that the remote microservice has responded to the request, finishing, by the system, processing the request with the group of microservices.

An example non-transitory computer-readable medium can comprise instructions that, in response to execution, cause a system comprising a processor to perform operations. These operations can comprise maintaining a secure connection with a computer that is external to the system, wherein the computer executes a microservice. These operations can further comprise receiving a request to invoke microservices. These operations can further comprise invoking the microservice via a secure connection based on identifying the microservice via a tag of the request, wherein the tag was applied to the request by the system. These operations can further comprise, after determining that the microservice has responded to the request, finishing processing the request via the microservices.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow that can facilitate stretched environment provisioning, in accordance with an embodiment of this disclosure;

FIG. 8 illustrates another example process flow that can facilitate stretched environment provisioning, in accordance with an embodiment of this disclosure;

DETAILED DESCRIPTION

Overview

Figure 1:
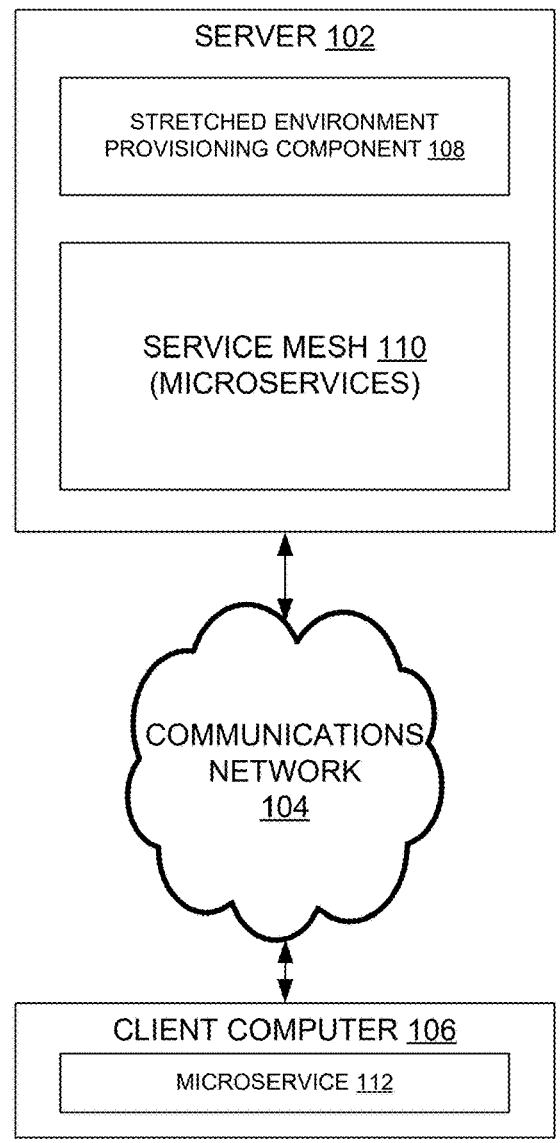
FIG. 1 illustrates an example system architecture that can facilitate stretched environment provisioning, in accordance with an embodiment of this disclosure.

The present techniques generally relate to efficiently creating an isolated environment for the user within existing service mesh, and provisioning a stretched environment, where this isolated environment extends to a user's computer.

It can be that typical microservices environments consist of hundreds or even thousands of the microservices that form a complex graph of dependencies between them. A service mesh can be used in such systems to ease the task of traffic routing, upgrades, access control, etc.

When a new feature or fix is developed, it can be desired to validate this feature or fix as a part of the whole service mesh. For example, if the feature introduces changes even to a single microservice, it can be desired that this microservice is tested as a part of the whole system to make sure that the system behavior is correct and new problems have not been introduced. This can also be relevant to critical production issues that cannot be easily reproduced in a staging environment due to specific production data—it can be desired that such fixes are thoroughly verified in production as a part of the whole service mesh, and without a risk of breaking the whole system.

Prior approaches in this area can generally be as follows. A prior approach can be to perform a simple validation of the microservice locally on a developer's computer, and then to submit the change to a staging environment where the change can be validated manually, and through automated tests.

But in case that the new change introduces a problem, another flow that depends on the changed microservice could become broken until the problem is discovered and resolved. Such an outcome can make the whole environment unusable, especially considering examples where multiple developers work on different microservices, and each one of them might introduce a problem.

Another prior approach can be to create a full copy of the current staging environment, just with the changed microservices instead of the original ones (such as in a separate namespace). Then testing can be performed in this environment, without introducing the problems to the main staging environment. In some examples, the changes will be deployed to the main staging environment only where the tests are successful. This approach can guarantee extra stability for the main staging branch, but can be very expensive—every introduced change can require a full copy of the original environment, which might consist of hundreds of the microservices.

Another prior approach can be to use feature flags to isolate the code changes, so only specific users that were defined per feature flag can reach the changes. It can be that this approach does not provide a complete solution because some changes are too wide and cannot be isolated (e.g., changing significant libraries, database drivers, etc.).

A problem addressed by the present techniques can be how to provision an isolated environment for new changes in such a way that it does not require a full copy of the original environment, and also does not introduce fragility due to multiple broken flows in the same shared environment.

A solution to this problem, according to the present techniques, can be to deploy changed microservices to a shared environment, where their instances can coexist alongside the original unchanged instances. Using a service mesh's capabilities and "deployment validator" information received from a continuous integration/continuous deployment (CI/CD) process, smart routing can be performed: a flow originated by the deployment validator can pass through the changed microservices instances, while a flow originated by other users can pass through the original microservices instances, which are not related to the changes. Microservices that are not related to the changes can be shared by both the deployment validator and other users.

Provisioning of an isolated environment within service mesh based microservice systems can allow deploying and verifying critical patches to an isolated environment directly within production, without effecting real production traffic. This ability can be critical where the problem can be tested/reproduced only in production due to a very specific circumstances/data. Provisioning of an isolated environment can also facilitate increasing development velocity by allowing much faster validation of features/fixes. The isolated environment can be created automatically, and can allow validating features without affecting other people who work in the environment, or, vice versa, being affected by their work in case of any problems in the introduced changes. The isolated environment can facilitate reducing costs associated with provisioning of a full copy of the environment for every change. Producing a full copy for every change can require lots of resources that are not always available in on-premise environments, or cost a lot of money in cloud environments.

In some examples, provisioning of an isolated environment can be a complex task due to the following reasons. There can be hundreds or thousands of microservices that have complex dependencies one on another. There can be multiple users that introduce changes within the same environment to multiple microservices. It can be infeasible to create a full copy of an original environment for every change. Taking these constraints into consideration, there can be a desire for a system that allows each user to have an "illusion" of having its own dedicated environment, even though in reality the environment is shared among dozens or hundreds of users.

In some examples, the present techniques can generally be divided into two parts: deploy time and runtime. In deploy time, there can be isolated environment provisioning, which can allow only a deployment validator's application programming interface (API) calls to pass through changed microservices, while other users' API calls pass through the original versions of the microservices. In runtime, end user information can be propagated through call chains to be able to achieve user-based routing described with respect to deploy time.

The present techniques can be implemented to achieve efficient, automatic provisioning of isolated environments within existing service mesh-based microservices systems. This can facilitate creating a more stable environment, increase development velocity, and make it easier to troubleshoot and validate critical production issues.

Techniques can be implemented to create a stretched isolated environment with a service mesh.

Such an environment can facilitate developers in working in full isolation within a same shared cluster without being affected by changes introduced by other developers. Utilizing environmental isolation can address problems relating to multiple developers working on a shared cluster. However, utilizing environmental isolation can pose challenges related to excessive resource consumption and roundtrip communication in the cluster.

A problem that can be addressed through the present techniques can relate to excessive resource consumption. While computing resources can be saved when by avoiding provisioning an entire cluster to a single developer, it can be that each instance of a service that is deployed to the provisioned cluster can still consume compute resources. In some examples, this amount of computing resources consumed can be large where there is a large base of developers or feature span.

Another problem that can be addressed through the present techniques can relate to excessive roundtrip communication. Prior approaches can require a developer to deploy changes to an environment when local change(s) in the code are made. Moreover, in cases when debugging the code is required as part of the development, the experience can be impacted as remote communication can be required. These roundtrip nature of communications can result in reduced productivity.

The present techniques can be implemented to isolate a development environment while utilizing local computing resources of each developer. In this approach, a stretched development environment can be created while utilizing both existing cluster resources and local user resources.

The present techniques can be implemented to facilitate creating a stretched isolated environment for a user that utilizes services within a shared cluster, and services within user local workstations.

Benefits of the present techniques can include removing load from a shared cluster; facilitating multiple users in working in a shared cluster without being affected by each other's modifications; increasing a feature release rate due to avoiding deployment to a shared cluster; and improving a development cycle due to being able to investigate and troubleshoot problems locally without relying on local debugging.

According to the present techniques clients can integrate with an existing deployment without a need to provision an entire application. Since each deployment is local, this can allow for quick changes and local interactions, allowing the user to enjoy from the best of both worlds.

Example Architectures

FIG. 1 illustrates an example system architecture 100 that can facilitate stretched environment provisioning, in accordance with an embodiment of this disclosure.

System architecture 100 comprises server 102, communications network 104, and client computer 106. In turn, server 102 comprises stretched environment provisioning component 108, and service mesh 110 (microservices). And client computer 106 comprises microservice 112.

Figure 10:
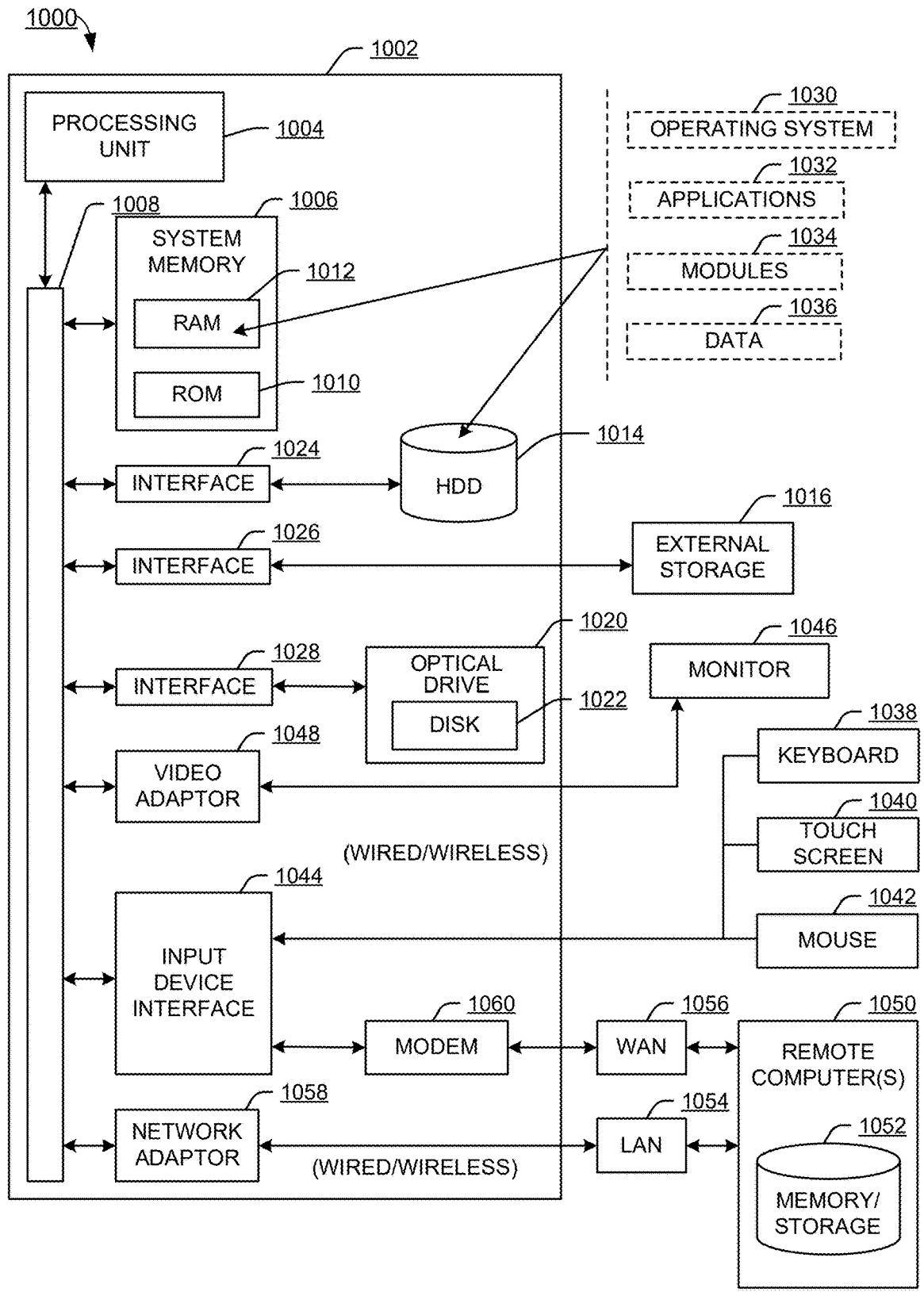
FIG. 10 illustrates an example block diagram of a computer operable to execute an embodiment of this disclosure.

Each of server 102 and/or client computer 106 can be implemented with part(s) of computing environment 1000 of FIG. 10. Communications network 104 can comprise a computer communications network, such as the Internet.

Server 102 can host a service that comprises a group of microservices, and do so within service mesh 110. Stretched environment provisioning component 108 can receive a changeset for one of those microservices from client computer 106. This changeset can be associated with a user account that submitted the changeset to server 102.

Stretched environment provisioning component 108 can facilitate incorporating microservice 112 of client computer 106 as part of a stretched environment with service mesh 110 of server 102. Then, requests from client computer 106 to service mesh 110 can be serviced with microservice 112, along with service mesh 110.

In some examples, stretched environment provisioning component 108 can implement part(s) of the process flows of FIGS. 5-9 to implement stretched environment provisioning.

It can be appreciated that system architecture 100 is one example system architecture for stretched environment provisioning, and that there can be other system architectures that facilitate stretched environment provisioning.

Figure 2:
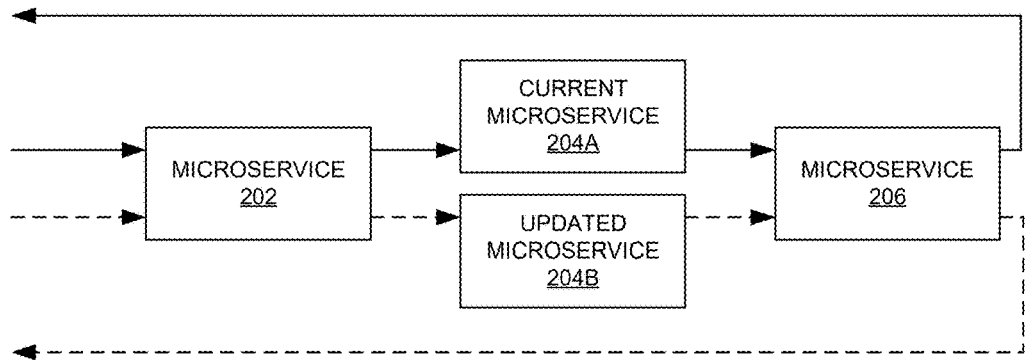
FIG. 2 illustrates another example system architecture that can facilitate stretched environment provisioning, in accordance with an embodiment of this disclosure.

FIG. 2 illustrates another example system architecture 200 that can facilitate stretched environment provisioning, in accordance with an embodiment of this disclosure. In some examples, part(s) of system architecture 200 can be used to implement a microservices architecture that is hosted by server 102 of FIG. 1 in service mesh 110.

System architecture 200 comprises stretched environment provisioning component 208 (which can be similar to stretched environment provisioning component 108 of FIG. 1), microservice 202, current microservice 204A, updated microservice 204B, and microservice 206.

Each of microservice 202, current microservice 204A, updated microservice 204B, and microservice 206 can comprise a computer service that is configured to interact with other microservice(s) via a service mesh to provide a service. A service mesh can generally comprise a dedicated infrastructure layer that facilitates transparently adding capabilities like observability, traffic management, and security without adding them to the code of microservices that run in the service mesh.

Updated microservice 204B can represent an updated version of current microservice 204A, and both can be in operation concurrently. Relative to the example of FIG. 1, updated microservice 204B can be similar to microservice 112 on client computer 106, and current microservice 204A can be a corresponding microservice on service mesh 110.

Figure 3:
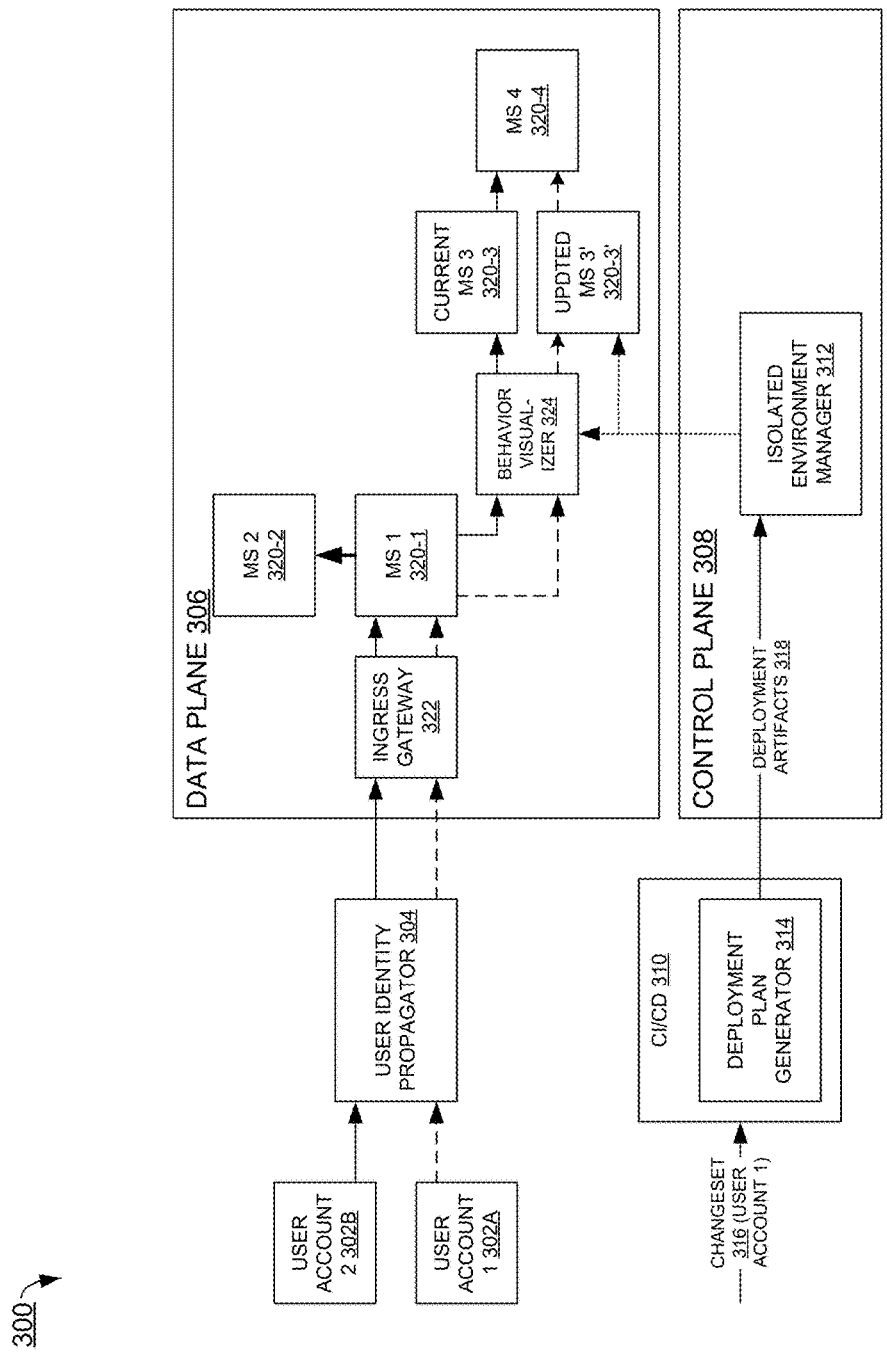
FIG. 3 illustrates another example system architecture that can facilitate stretched environment provisioning, in accordance with an embodiment of this disclosure.

FIG. 3 illustrates another example system architecture 300 that can facilitate stretched environment provisioning, in accordance with an embodiment of this disclosure. In some examples, part(s) of system architecture 300 can be used to implement part(s) of system architecture 100 of FIG. 1.

System architecture 300 can generally depict an example where an isolated environment is maintained within a service mesh. In contrast, system architecture 400 of FIG. 4 can generally depict an example where an isolated environment is stretched to include another computer.

System architecture 300 comprises user account 1 202A and user account 2 202B (which can comprise user account identities in a computing service or device), user identity propagator 304, data plane 306, control plane 308, CI/CD 310, isolated environment manager 312, deployment plan generator 314, changeset 316, deployment artifacts 318, microservice 1 320-1, microservice 2 320-2, current microservice 3 320-3, updated microservice 3' 320-3', microservice 4 320-4, ingress gateway 322, and behavior visualizer 324.

User identity propagator 304 can receive an indication of user account 1 302A and/or user account 2 302B and propagate that user identity through the service mesh of data plane 306 so that routing decisions among isolated environments can be made based on user identity. Data plane 306 and control plane 308 can be parts of a service mesh, where data plane 306 carries out policies for microservices in a service mesh (e.g., routing decisions) that are defined by control plane 308.

CI/CD 310 can comprise a continuous integration/continuous delivery service that is configured to integrate changes to the microservices of data plane 306 into data plane 306, and to facilitate deploying those changes to data plane 306. Isolated environment manager 312 can determine routing policies for data plane 306 so that multiple versions of a microservice can coexist in separate isolated environments.

Deployment plan generator 314 can be configured to create deployment artifacts (e.g., deployment artifacts 318) from a changeset (e.g., changeset 316), and these deployment artifacts can be used to set routing policies by isolated environment manager 312. Changeset 316 can comprise a changeset for current microservice 3 320-3 (to create updated microservice 3' 320-3) that is submitted by user account 1 302A.

Ingress gateway 322 can be configured to load balance incoming requests to a service mesh architecture of data plane 306. Behavior visualizer 324 can be configured to visualize behavior a service mesh architecture of data plane 306 after applying virtual service and destination rules that are generated based on deployment artifacts 318.

Microservice 1 320-1, microservice 2 320-2, current microservice 3 320-3, updated microservice 3' 320-3', and microservice 4 320-4 can each be microservices in a service mesh architecture of data plane 306. Updated microservice 3' 320-3' can comprise an updated version of current microservice 3 320-3, and there can be separate isolated environments for updated microservice 3' 320-3' and current microservice 3 320-3.

Put another way, changeset 316 and an identifier of user account 1 302A can be received by deployment plan generator 314, which can generate deployment artifacts 31. Isolated environment manager 312 can receive deployment artifacts 318 and apply them in order to create updated microservice 3' 320-3', as well as adjust routing rules so that traffic of user account 1 302A can be routed to updated microservice 3' 320-3'.

User account 1 302A and user account 2 302B can execute flows and their corresponding user names can be propagated by user identity propagator 304. So, user account 1 302A can be routed within its isolated environment that includes instances of microservice 1 320-1, microservice 2 320-2, updated microservice 3' 320-3', and microservice 4 320-4 through the chain microservice 1 320-1, updated microservice 3' 320-3', and microservice 4 320-4. Then user account 2 302B can be routed within its isolated environment that includes instances of microservice 1 320-1, microservice 2 320-2, updated microservice 3 320-3, and microservice 4 320-4 through the chain microservice 1 320-1, updated microservice 3 320-3, and microservice 4 320-4.

A high-level flow can be as follows. Deployment plan generator 314 can be installed in CI/CD 310. Deployment plan generator 314 can generate artifacts (e.g., deployment artifacts 318) needed by the service mesh and deployment orchestrator for creation of a changed microservice's instance (e.g., updated microservice 3' 320-3'), and for routing traffic for the user that made the change to the changed microservice's instance.

Isolated environment manager 312 can be installed in control plane 308 of the service mesh, and apply service mesh artifacts that are received from the deployment plan generator. Service mesh artifacts can comprise, e.g., a YAML or JSON file. Service mesh artifacts can reference a microservice image that an instance of a microservice is to be created from, as well as additional information such as what labels to put and how many instances to process.

User identity propagator 304 can be installed as a plugin within a web browser, and can pass a user name of a logged in user as a special header value so that routing rules created by the deployment plan generator can act upon the header value in order to route the traffic to the changed microservice instance (e.g., updated microservice 3' 320-3') only for a user who made the change.

That is, relative to a prior system architecture, changes can be introduced to a CI/CD process, a service mesh, and a running application to integrate between those three systems in order to achieve automatic provisioning of the isolated environment.

Generating a deployment plan can be performed as follows. Deployment plan generator 314 can be installed in CI/CD 310. A developer submitting the changes can pass a <username> (which can be later used to login to the application) to CI/CD 310 as an input. Deployment plan generator 314 can receive the <username> from CI/CD 310, and can generate service mesh artifacts (e.g., deployment artifacts 318; in some examples, these can be files in a human-readable format, such as Yet Another Markup Language (YAML) or JavaScript Object Notation (JSON) files) that can allow creating a new instance of the microservice, where the new instance is marked with a special label. The value of this label can be set to <username>.

In addition, deployment plan generator 314 can generate artifacts in deployment artifacts 318 that are used to adjust routing rules to allow only traffic with a special header that matches the label to reach the changed microservice instance.

Note that a service mesh can generally comprise a dedicated infrastructure layer that allows transparently adding capabilities, like observability, traffic management, and security without adding them to microservices code. With the present techniques, a service mesh's traffic management capability can be used in order to create an isolated environment for a target user.

The following example can illustrate the present techniques, as they relate to artifacts generation for creating an isolated environment for user test_user1. This can be an orchestration deployment artifact that is intended for use for any user in its application, so its label named "user" has a value of "any." The image name can be jsmith/orders:

```
kind: Deployment
metadata:
    name: orders
spec:
    replicas: 1
    selector:
        matchLabels:
            app: orders
    template:
        metadata:
            labels:
                app: orders
                user: any
        spec:
            containers:
            -   name: orders
                image: jsmith/orders
                ports:
                - containerPort: 8080
```

The following can be an orchestration deployment artifact that is created specifically for test_user1, so its label named "user" has value "test_user1." The image of the microservice here is named jsmith/orders-v2—it contains a change that was submitted by a user who will validate the change using username "test_user1."

```
kind: Deployment
metadata:
    name: orders
spec:
    replicas: 1
    selector:
        matchLabels:
            app: orders
    template:
        metadata:
            labels:
                app: orders
                user: test_user1
        spec:
            containers:
            -   name: orders
                image: jsmith/orders-v2
                ports:
                - containerPort: 8080
```

The following can be a service mesh destination rule artifact that facilitates dividing incoming traffic to subsets. Here, traffic can be divided using a "user" label that is presented in the orchestrator's deployment artifact listed above. So, here, a new subset named "test_user1" is added to an existing destination rule.

```
    kind: DestinationRule
    metadata:
        name: orders-destination-rule
    spec:
        host: orders-svc
        subsets:
            -          name: test_user1
                labels:
                    user: test_user1
            -          name: any
                labels:
                    user: any
```

The following can be a service mesh's virtual service artifact. A part can be added that permits checking for a value of an end-user header, and if it is equal to test_user1, then the traffic can be routed to a subset named test_user1. This can mean that traffic will reach the microservice created off the image jsmith/orders-v2 that contains the change introduced by the user testing with test_user1.

```
    kind: VirtualService
    metadata:
        name: reviews
    spec:
        hosts:
            -      reviews
        http:
            -      match:
                -          headers:
                        end-user:
                            exact: test_users1
                route:
                -          destination:
                        host: orders-svc
                        subset: test_user1
            -      route:
                -          destination:
                        host: orders-svc
                        subset: any
```

Isolated environment management can be performed as follows. An isolated environment manager can be installed in a control plane of the service mesh and can apply the service mesh artifacts received from the deployment plan generator in order to provision the new microservice instance with the required label, and adjust routing rules accordingly.

Later, when a user finishes its tasks within the environment, the isolated environment manager can be used to revert back all changes that were applied to create the isolated environment.

So, in the case of the previous example, to revert back all the changes can mean removing the corresponding snippets from a virtual service, destination rule and redeploy those artifacts, then apply the removal of the corresponding orchestration deployment file. That is, the changes can be applied in a reverse order as a creation flow. For removing the isolated environment, it can be that all the configuration changes related to it are removed, and apply this so that service mesh adjusts accordingly. For example, where the virtual service has a specific configuration per test_user1—it can be removed and the service mesh can be informed that it is no longer relevant. That is, this can be removed from deployment artifacts:

```
    http:
        -      match:
            -          headers:
                    end-user:
                        exact: test_users1
        route:
            -      destination:
                host: orders-svc
                subset: test_user1
```

Similarly, this can be removed from deployment artifacts for a destination rule:

```
    subsets:
        -          name: test_user1
            labels:
                user: test_user1
```

A user identity can be propagated as follows. A user identity propagator can be installed as a plugin within a web browser, or in addition to an application itself. The user identity propagator can take a <username> that was used to login, and can set a dedicated header named end-user with a value equal to <username>.

An end-user header can be propagated between microservices that are participating in the call chain. For this purpose, a dedicated interceptor can be used that can catch an incoming request, fetch an end-user header, and put it on an outgoing request.

An alternative approach can be to take a dedicated library, and configure it to handle an end-user header.

It can be that each flow originating from a browser can include an end-user header with the <username> value above. The value of the header can be consumed by routing rules generated by the deployment plan generator in order to route the traffic of the logged in <username> to its own dedicated microservice instances that were created previously through the corresponding deployment.

It can be that some service meshes can deduce a user from tokens (e.g., JSON web tokens (JWT tokens), and use those for routing.

Figure 4:
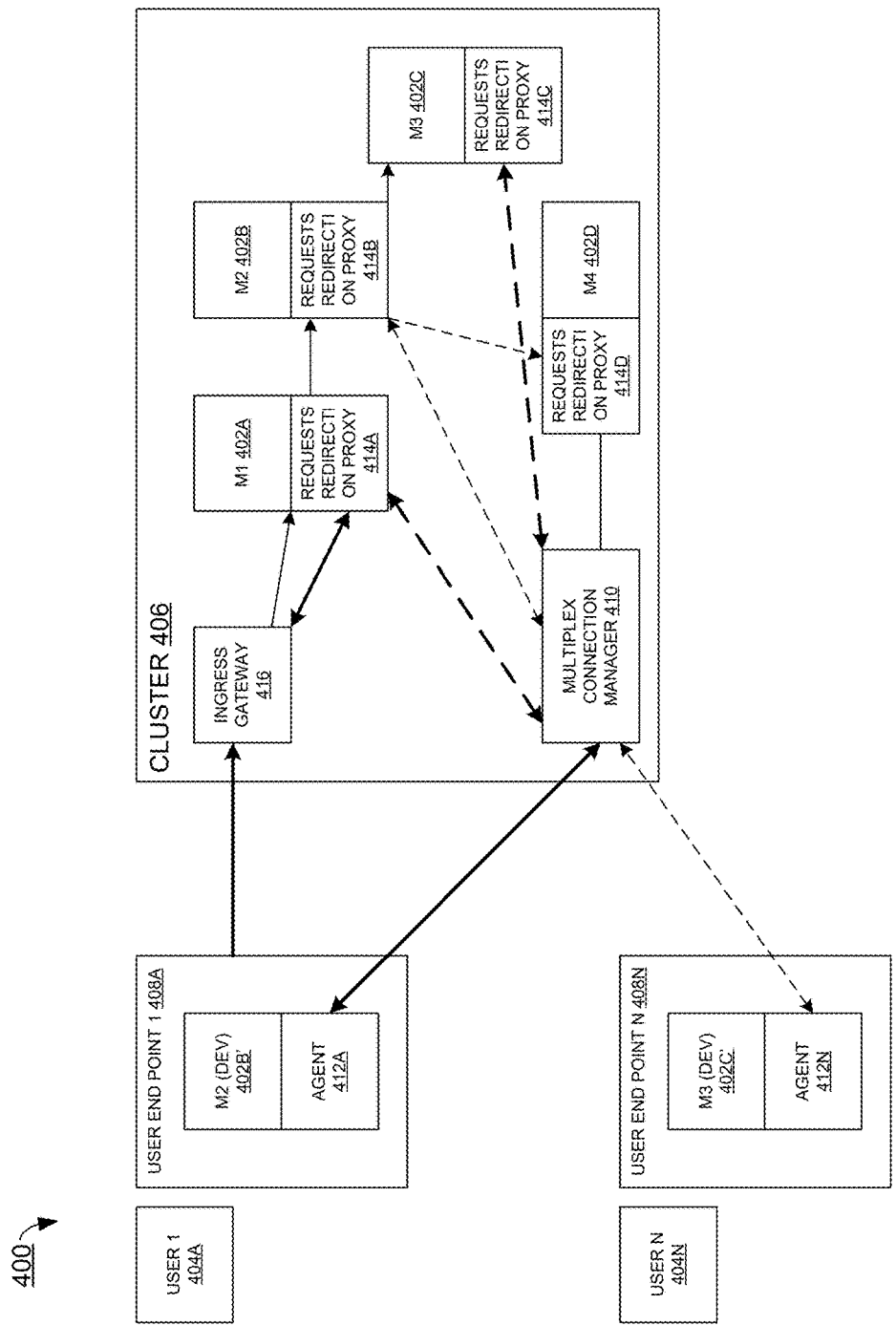
FIG. 4 illustrates another example system architecture that can facilitate stretched environment provisioning, in accordance with an embodiment of this disclosure.

FIG. 4 illustrates another example system architecture 400 that can facilitate stretched environment provisioning, in accordance with an embodiment of this disclosure. In some examples, part(s) of system architecture 300 can be used to implement part(s) of system architecture 100 of FIG. 1.

System architecture 400 comprises microservices M1 402A, M2 402B, M3 402C, and M4 402D; microservices M2 (dev) 402B' and M3 (dev) 402C'; user 1 404A and user N 404N; cluster 406; user end point 1 408A and user end point N 408N; multiplex connection manager 410; agent 412A and agent 412N; requests redirection proxy 414A, requests redirection proxy 414B, requests redirection proxy 414C, and requests redirection proxy 414D; and ingress gateway 416.

In system architecture 400, there is a group of interrelated microservices M1 402A, M2 402B, M3 402C, and M4 402D. User 1 404A can initiate a request to cluster 406. The request can be intended to pass through microservice M1 402A, M2 402B, and M3 402C. However, it can be that user 1 404A owns a local environment that hosts microservice M2 (dev) 402B'. So, as a result of smart routing performed according to the present techniques, the request can utilize a local environment (user end point 1 408A), and pass through M1 402A, M2 (dev) 402B', and M3 402C Multiplex connection manager 410 can be responsible for maintaining secured connection with user agents (e.g., agent 412A and agent 412N). Since the user end points can be external, it can be that the development cluster cannot initiate the communication due to the nature of networking deployment and restrictions. As such, the users can initiate the communication channels by creating a secured connection with multiplex connection manager 410. The channels can remain open throughout the user interaction with the cluster.

Multiplex connection manager 410 can receive requests from internal cluster services and propagate them to a user agent as incoming requests.

In order to save resources, a bidirectional multiplex channel can be maintained. This can involve serving each user with different logical requests allowing multiple handling of different services communication requirements.

An instance of a requests redirection proxy (e.g., requests redirection proxy 414A, requests redirection proxy 414B, requests redirection proxy 414C, and requests redirection proxy 414D) can reside on each deployed microservice in cluster 406, and intercept incoming and outgoing requests. In a case of an outgoing request comprising a special tag (e.g., a predefined header indicating redirection to client), the request can be propagated to multiplex connection manager 410 with the specified tag, and multiplex connection manager 410 can map the tag to the open channel for the user and forward the request.

Additionally, tagging can aid in identifying which outbound communication should be redirected (that is, which service in the chain is relevant to a particular user).

A user communication agent (e.g., agent 412A and agent 412N) can maintain a bidirectional communication from the user side. The user communication agent can receive traffic from multiplex connection manager 410, and can forward the request locally to the running service (e.g., M2 (dev) 402B' or M3 (dev) 402C').

It can be that, when user 1 404A is performing requests to the application, this user does not interfere with user N 404N, because they are using different tagging for their requests, rendering its environment logically isolated.

Example Process Flows

Figure 5:
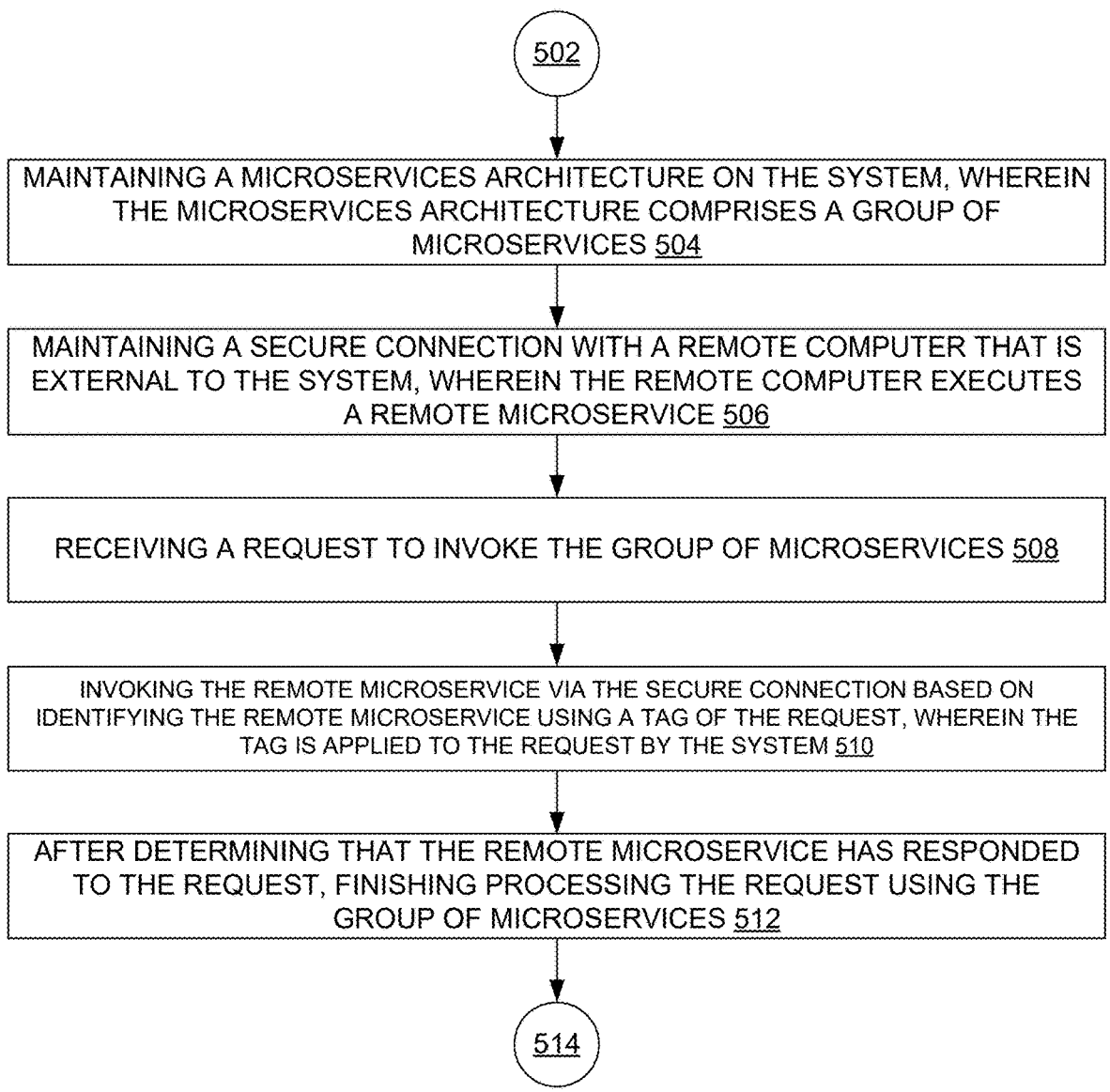
FIG. 5 illustrates an example process flow that can facilitate stretched environment provisioning, in accordance with an embodiment of this disclosure.

FIG. 5 illustrates an example process flow 500 that can facilitate stretched environment provisioning, in accordance with an embodiment of this disclosure. In some examples, one or more embodiments of process flow 500 can be implemented by stretched environment provisioning component 108 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts maintaining a microservices architecture on the system, wherein the microservices architecture comprises a group of microservices. In some examples, this microservices architecture can be similar to the group of interrelated microservices M1 402A, M2 402B, M3 402C, and M4 402D on cluster 406 in FIG. 4.

After operation 504, process flow 500 moves to operation 506.

Operation 506 depicts maintaining a secure connection with a remote computer that is external to the system, wherein the remote computer executes a remote microservice. Using the example of FIG. 4, this can be a secure connection between cluster 406 and a computer of user 1 404A.

In some examples, the remote microservice comprises an updated version of a microservice of the group of microservices. That is, using the example of FIG. 4, the remote microservice can be M2 (dev) 402B' and the microservice can be M2 402B.

After operation 506, process flow 500 moves to operation 508.

Operation 508 depicts receiving a request to invoke the group of microservices. Using the example of FIG. 4, this can be a request imitated from computer of user 1 404A, and received by cluster 406.

In some examples, the request is a first request, and operation 506 comprises processing a second request with the microservice instead of the remote microservice. That is, multiple isolated environments can be implemented. Where user N 404N makes a request to cluster 406, it can be that this request is serviced using M2 402B instead of M2 (dev) 402B'.

In some examples, the request is originated by the remote computer. That is, it can be that a developer with a local version of a microservice that the developer is working on makes the request, and the local version of the microservice is then used to service the request.

After operation 508, process flow 500 moves to operation 510.

Operation 510 depicts invoking the remote microservice via the secure connection based on identifying the remote microservice using a tag of the request, wherein the tag is applied to the request by the system. Continuing with the example of FIG. 4, this can comprise invoking M2 (dev) 402B' instead of M2 402B.

In some examples, the invoking of the remote microservice is performed by a multiplex connection manager of the system that is separate from the group of microservices. This can be similar to multiplex connection manager 410 of FIG. 4.

In some examples, the remote microservice corresponds to a different version of a first microservice of the group of microservices, wherein respective microservices of the group of microservices are associated with respective sidecar proxies, and wherein a sidecar proxy of the sidecar proxies that is associated with a second microservice of the group of microservices that invokes the first microservice via an outgoing request is configured to redirect the outgoing request to the multiplex connection manager based on the tag being identified in the outgoing request. In some examples, and using the example of FIG. 4, this sidecar proxy can be requests redirection proxy 414C, which can be associated with MS1 402A, and redirects the request to multiplex connection manager 410 (to invoke M2 (dev) 402B') instead of to M2 402B.

In some examples, the invoking of the remote microservice is performed via contacting an agent on the remote computer that is separate from the remote microservice. Continuing with the example of FIG. 4, this agent can be similar to agent 412A, which is associated with M2 (dev) 402B'.

After operation 510, process flow 500 moves to operation 512.

Operation 512 depicts, after determining that the remote microservice has responded to the request, finishing processing the request using the group of microservices. Continuing with the example of FIG. 4, this can comprise invoking M3 402C after invoking M2 (dev) 402B'.

In some examples, operation 512 comprises redirecting an outgoing request of the remote microservice that is received by the system to a microservice of the group of microservices that is identified by the outgoing request. Continuing with the example of FIG. 4, M2 (dev) 402B' can issue an outgoing request to invoke M3 402C, and this request can be received by cluster 406 and redirected to M3 402C.

After operation 512, process flow 500 moves to 514, where process flow 500 ends.

Figure 6:
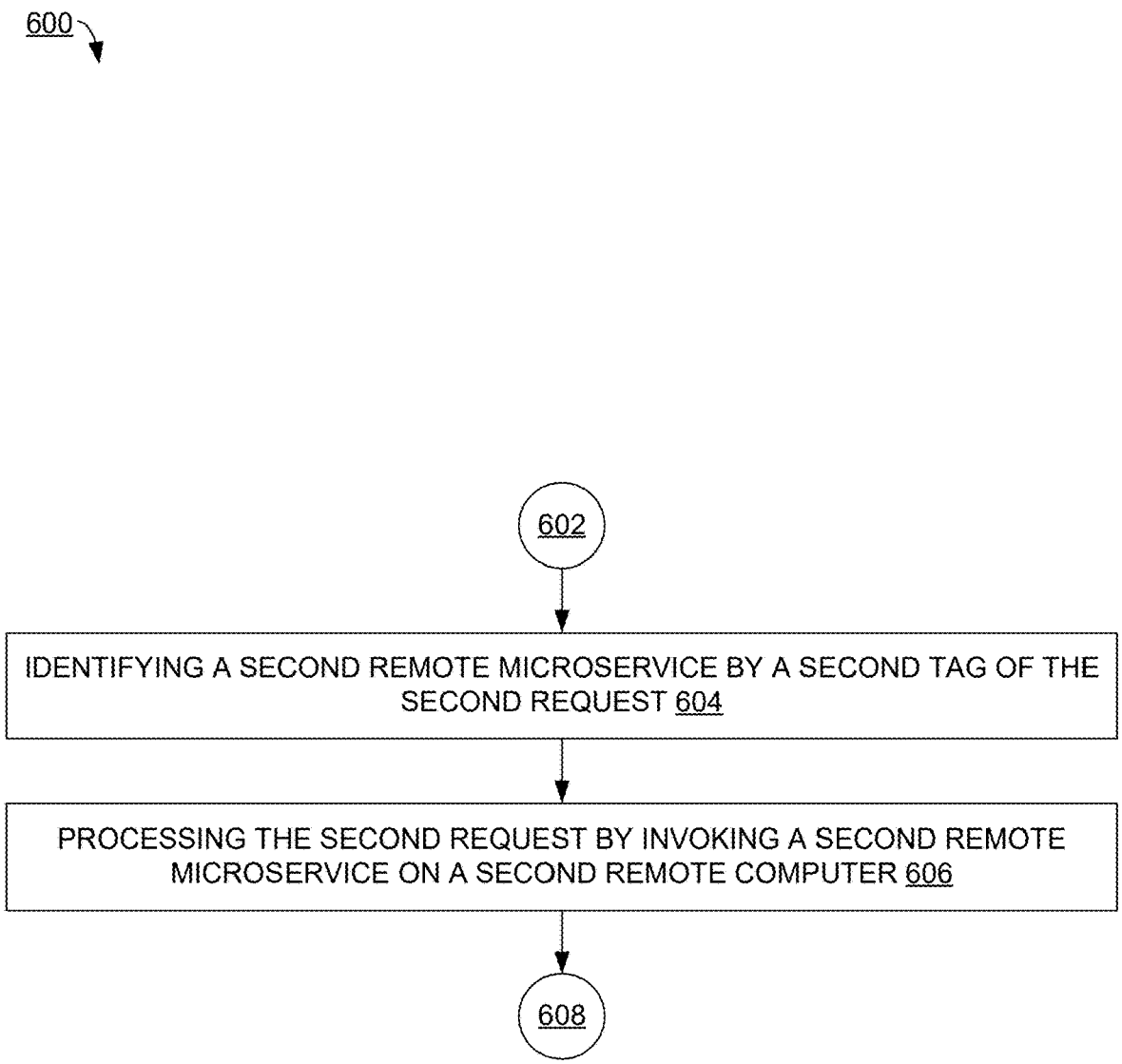
FIG. 6 illustrates another example process flow that can facilitate stretched environment provisioning, in accordance with an embodiment of this disclosure.

FIG. 6 illustrates an example process flow 600 that can facilitate stretched environment provisioning, in accordance with an embodiment of this disclosure. In some examples, one or more embodiments of process flow 600 can be implemented by stretched environment provisioning component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, and/or process flow 900 of FIG. 9.

Process flow 600 begins with 602, and moves to operation 604.

In some examples where process flow 600 is implemented in conjunction with process flow 500 of FIG. 5, the secure connection is a first secure connection, the remote computer is a first remote computer, the remote microservice is a first remote microservice.

Operation 604 depicts identifying a second remote microservice by a second tag of the second request. That is, using the example of FIG. 4, a second request can be initiated by a computer of user N 404N, and this request can be tagged to note that. Then, requests associated with user N 404N can be routed to the second microservice, which can be M3 (dev) 402C' (instead of M3 402C).

After operation 604, process flow 600 moves to operation 606.

Operation 606 depicts processing the second request by invoking a second remote microservice on a second remote computer. Continuing with the example of FIG. 4, this can comprise invoking M3 (dev) 402C' at a computer of user N 404N.

Combined, operations 604-606 can depict processing a second request by invoking a second remote microservice on a second remote computer, based on identifying the second remote microservice by a second tag of the second request.

In this manner, multiple isolated stretched environments can be implemented with cluster 406 of FIG. 4, such as one for user 1 404A and another for user N 404N.

After operation 606, process flow 600 moves to 608, where process flow 600 ends.

FIG. 7 illustrates an example process flow 700 that can facilitate stretched environment provisioning, in accordance with an embodiment of this disclosure. In some examples, one or more embodiments of process flow 700 can be implemented by stretched environment provisioning component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts maintaining a secure connection with a computer that is external to the system, wherein the computer executes a remote microservice. In some examples, operation 704 can be implemented in a similar manner as operation 506 of FIG. 5.

In some examples, operation 704 comprises initiating establishing the secure connection with the computer, wherein the system is not configured to process an initiating of the establishing of the secure connection with the system by the computer. Using the example of FIG. 4, this can comprise multiplex connection manager 410 initiating establishing the secure connection with agent 412A, where agent 412A is external and cannot initiate a communication with multiplex connection manager 410 due to networking deployment restrictions.

In some examples, the secure connection comprises a bidirectional multiplex channel.

After operation 704, process flow 700 moves to operation 706.

Operation 706 depicts receiving a request to invoke a group of microservices. In some examples, operation 706 can be implemented in a similar manner as operation 508 of FIG. 5.

After operation 706, process flow 700 moves to operation 708.

Operation 708 depicts invoking the remote microservice via the secure connection based on identifying the remote microservice by a tag of the request, wherein the tag is applied to the request by the system. In some examples, operation 708 can be implemented in a similar manner as operation 510 of FIG. 5.

In some examples, a header of the request identifies the tag.

After operation 708, process flow 700 moves to operation 710.

Operation 710 depicts, after determining that the remote microservice has responded to the request, finishing processing the request with the group of microservices.

In some examples, operation 710 can be implemented in a similar manner as operation 512 of FIG. 5.

After operation 710, process flow 700 moves to 712, where process flow 700 ends.

FIG. 8 illustrates an example process flow 800 that can facilitate stretched environment provisioning, in accordance with an embodiment of this disclosure. In some examples, one or more embodiments of process flow 800 can be implemented by stretched environment provisioning component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts establishing the secure connection with the computer before invoking the remote microservice. Using the example of FIG. 4, multiplex connection manager 410 can establish the secure connection with agent 412A before invoking MS2 (dev) 402B'.

After operation 804, process flow 800 moves to operation 806.

Operation 806 depicts keeping the secure connection open throughout user account interaction with the system, wherein the user account is associated with the computer. By keeping the secure connection open during the interaction, this can save time and computing resources relative to establishing and tearing down a connection multiple times while processing requests.

After operation 806, process flow 800 moves to 808, where process flow 800 ends.

Figure 9:
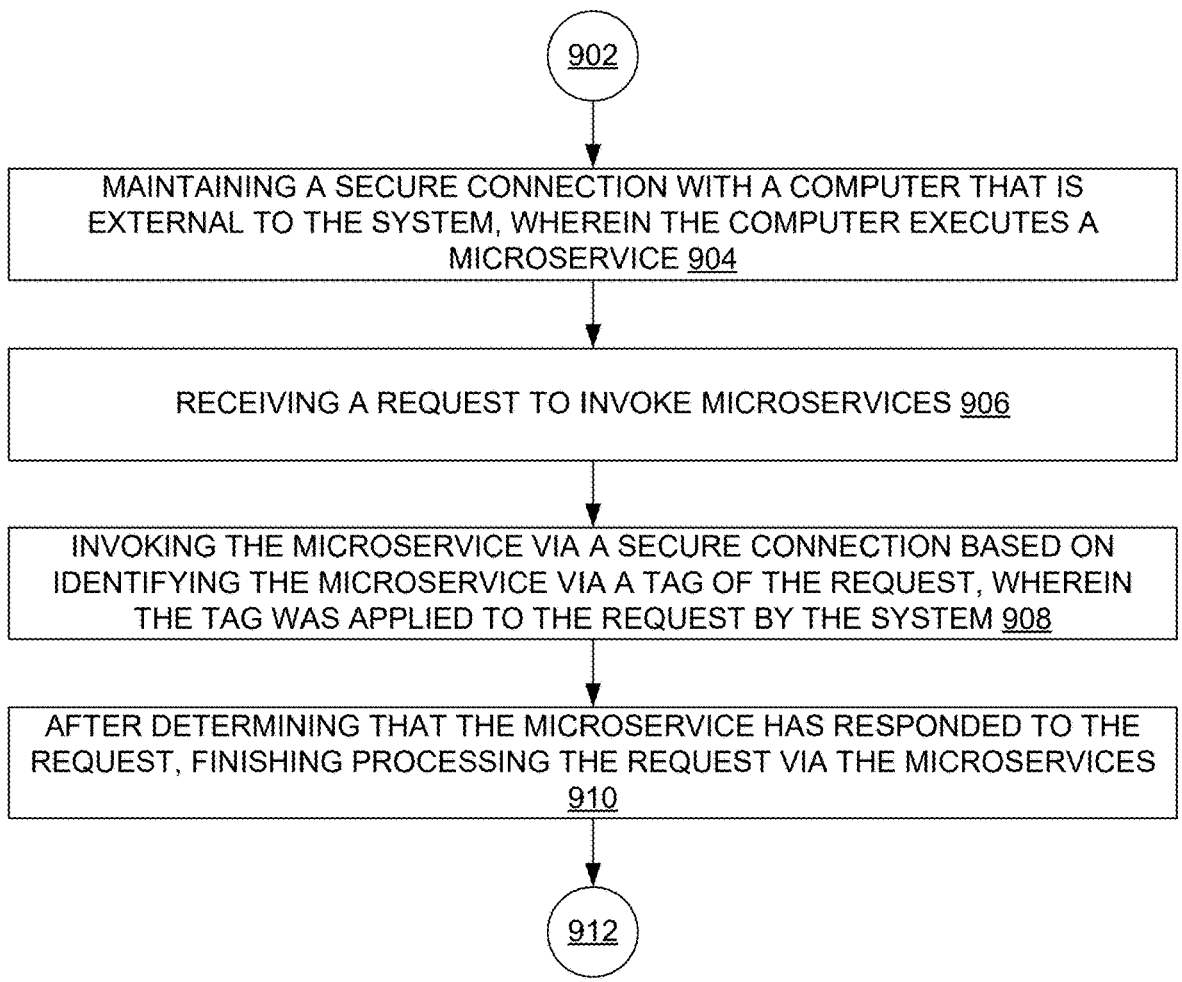
FIG. 9 illustrates another example process flow that can facilitate stretched environment provisioning, in accordance with an embodiment of this disclosure.

FIG. 9 illustrates an example process flow 900 that can facilitate stretched environment provisioning, in accordance with an embodiment of this disclosure. In some examples, one or more embodiments of process flow 900 can be implemented by stretched environment provisioning component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, and/or process flow 800 of FIG. 8.

Process flow 900 begins with 902, and moves to operation 904.

Operation 904 depicts maintaining a secure connection with a computer that is external to the system, wherein the computer executes a microservice. In some examples, operation 904 can be implemented in a similar manner as operation 506 of FIG. 5.

After operation 904, process flow 900 moves to operation 906.

Operation 906 depicts receiving a request to invoke microservices. In some examples, operation 906 can be implemented in a similar manner as operation 508 of FIG. 5.

In some examples, respective microservices of the microservices correspond to respective proxies that are configured to intercept incoming and outgoing requests of the respective microservices. These proxies can be similar to requests redirection proxy 414A, requests redirection proxy 414B, requests redirection proxy 414C, and requests redirection proxy 414D of FIG. 4.

In some examples, the microservices and the microservice comprise a stretched isolated environment for a first user account that is isolated from access by a second user account that has access to the group of microservices. That is, the present techniques can be implemented to create a stretched isolated environment for a user that utilizes services within the shared cluster and services within user local workstations.

After operation 906, process flow 900 moves to operation 908.

Operation 908 depicts invoking the microservice via a secure connection based on identifying the microservice via a tag of the request, wherein the tag was applied to the request by the system. In some examples, operation 908 can be implemented in a similar manner as operation 510 of FIG. 5.

In some examples, invoking the microservice corresponds to a first load on the system, invoking another microservice, which is local to the system and that corresponds to the microservice, corresponds to a second load on the system, and the first load is less than the second load. That is, implementing the present techniques can lower a load on a shared cluster (e.g., cluster 406 of FIG. 4).

In some examples, operation 908 comprises determining to invoke the microservice based on receiving microservice identification data via user account information corresponding to a user account that is associated with the request. That is, a developer can identify to a system to use a different microservice for that developer's requests to the system.

In some examples, the microservice is a first microservice of a chain of microservices that corresponds to the request, and operation 908 comprises authenticating the request on the system before invoking the microservice. That is, if the first microservice in a chain of microservices that corresponds to a request is on a developer's computer, the request can still authenticate on a cluster before going out to that computer.

After operation 908, process flow 900 moves to operation 910.

Operation 910 depicts, after determining that the microservice has responded to the request, finishing processing the request via the microservices. In some examples, operation 910 can be implemented in a similar manner as operation 512 of FIG. 5.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of server 102 and/or client computer 106 of FIG. 1, and/or cluster 406, user end point 1 408A, and/or user end point N 408N of FIG. 4.

In some examples, computing environment 1000 can implement one or more embodiments of the process flows of FIGS. 5-9 to facilitate stretched environment provisioning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
at least one processor; and
at least one memory that stores executable instructions that, when executed by the at least one processor, facilitate performance of operations, comprising:
maintaining a microservices architecture on the system, wherein the microservices architecture comprises a group of microservices;
maintaining, by a multiplex connection manager of the system, a secure connection with a remote computer that is external to the system, wherein the remote computer executes a remote microservice, wherein the multiplex connection manager is configured to maintain the secure connection for a duration of an interaction between the remote computer and the system, and wherein the multiplex connection manager is further configured to send communications between remote computers that comprise the remote computer and the group of microservices;

receiving a request to invoke the group of microservices from the remote computer;

as part of the invoking of the group of microservices, invoking, by the multiplex connection manager, the remote microservice via the secure connection based on identifying the remote microservice using a tag of the request, wherein the tag is applied to the request by the system; and after determining, by the multiplex connection manager, that the remote microservice has responded to the request, finishing processing the request using the group of microservices of the microservices architecture of the system.

2. The system of claim 1, wherein the remote microservice comprises an updated version of a microservice of the group of microservices.

3. The system of claim 2, wherein the request is a first request, and wherein the operations further comprise:

processing a second request with a prior version of the microservice of the group of microservices that corresponds to the updated version of the microservice instead of the remote microservice.

4. The system of claim 1, wherein the secure connection is a first secure connection, the remote computer is a first remote computer, the remote microservice is a first remote microservice, and wherein the operations further comprise:

processing a second request by invoking a second remote microservice on a second remote computer, based on identifying the second remote microservice by a second tag of the second request.

5. The system of claim 1, wherein the request is originated by the remote computer.

6. The system of claim 1, wherein the multiplex connection manager is separate from the group of microservices.

7. The system of claim 6, wherein the remote microservice corresponds to a different version of a first microservice of the group of microservices, wherein respective microservices of the group of microservices are associated with respective sidecar proxies, and wherein a sidecar proxy of the sidecar proxies that is associated with a second microservice of the group of microservices that invokes the first microservice via an outgoing request is configured to redirect the outgoing request to the multiplex connection manager based on the tag being identified in the outgoing request.

8. The system of claim 1, wherein the invoking of the remote microservice is performed via contacting an agent on the remote computer that is separate from the remote microservice.

9. The system of claim 1, wherein the finishing of the processing of the request using the group of microservices comprises:

redirecting an outgoing request of the remote microservice that is received by the system to a microservice of the group of microservices that is identified by the outgoing request.

10. A method, comprising:

maintaining, by a multiplex connection manager of a system comprising at least one processor, a secure connection with a computer that is external to the system, wherein the computer executes a remote microservice, wherein the multiplex connection manager is configured to maintain the secure connection for a duration of an interaction between the computer and the system, and wherein the multiplex connection manager is further configured to send communications between computers that comprise the computer and the group of microservices;

receiving, by the system and from the computer, a request to invoke a group of microservices;

as part of the invoking of the group of microservices, invoking, by the multiplex connection manager, the remote microservice via the secure connection based on identifying the remote microservice by a tag of the request, wherein the tag is applied to the request by the system; and after determining that the remote microservice has responded to the request, finishing, by the system, processing the request with the group of microservices of the system.

11. The method of claim 10, further comprising:

initiating, by the system, establishing the secure connection with the computer, wherein the system is not configured to process a request from the computer for the system to perform the establishing of the secure connection.

12. The method of claim 10, further comprising:

establishing, by the system, the secure connection with the computer before invoking the remote microservice; and keeping, by the system, the secure connection open throughout user account interaction with the system, wherein the user account is associated with the computer.

13. The method of claim 10, wherein a header of the request identifies the tag.

14. The method of claim 10, wherein the secure connection comprises a bidirectional multiplex channel.

15. A non-transitory computer-readable medium comprising instructions that, in response to execution, cause a system comprising at least one processor to perform operations, comprising:

maintaining, by a multiplex connection manager of the system, a secure connection with a computer that is external to the system, wherein the computer executes a microservice, wherein the multiplex connection manager is configured to maintain the secure connection for a duration of an interaction between the computer and the system, and wherein the multiplex connection manager is further configured to send communications between computers that comprise the computer and the group of microservices;

receiving, from the computer, a request to invoke microservices;

as part of the invoking of the group of microservices, invoking, by the multiplex connection manager, the microservice via a secure connection based on identifying the microservice via a tag of the request, wherein the tag was applied to the request by the system; and after determining that the microservice has responded to the request, finishing processing the request via the microservices of the system.

16. The non-transitory computer-readable medium of claim 15, wherein respective microservices of the microservices correspond to respective proxies that are configured to intercept incoming and outgoing requests of the respective microservices.

17. The non-transitory computer-readable medium of claim 15, wherein the microservices and the microservice comprise a stretched isolated environment for a first user account that is isolated from access by a second user account that has access to the group of microservices.

18. The non-transitory computer-readable medium of claim 15, wherein invoking the microservice corresponds to a first load on the system,
wherein invoking another microservice, which is local to the system and that corresponds to the microservice, corresponds to a second load on the system, and
wherein the first load is less than the second load.

19. The non-transitory computer-readable medium of claim 15, wherein the operations further comprise:
determining to invoke the microservice based on receiving microservice identification data via user account information corresponding to a user account that is associated with the request.

20. The non-transitory computer-readable medium of claim 15, wherein the microservice is a first microservice of a chain of microservices that corresponds to the request, and wherein the operations further comprise:
authenticating the request on the system before invoking the microservice.

* * * * *